(12) United States Patent
Britton

(10) Patent No.: US 7,061,236 B2
(45) Date of Patent: Jun. 13, 2006

(54) METAL DETECTOR

(75) Inventor: Andrew Michael Britton, Burton Upon Trent (GB)

(73) Assignee: Thermo Electron Corporation, Waltham, MA (US)

( * ) Notice: Subject to any disclaimer, the term of this patent is extended or adjusted under 35 U.S.C. 154(b) by 94 days.

(21) Appl. No.: 10/258,324

(22) PCT Filed: Mar. 6, 2001

(86) PCT No.: PCT/GB01/00958

§ 371 (c)(1),
(2), (4) Date: Apr. 30, 2003

(87) PCT Pub. No.: WO01/81953

PCT Pub. Date: Nov. 1, 2001

(65) Prior Publication Data

US 2003/0164766 A1    Sep. 4, 2003

(30) Foreign Application Priority Data

Apr. 20, 2000   (GB) .................................. 0009936.6

(51) Int. Cl.
*G01N 27/72* (2006.01)
*G01R 33/12* (2006.01)
(52) U.S. Cl. ...................... 324/233; 324/239; 240/551
(58) Field of Classification Search ................ 324/228, 324/236, 237, 239, 225, 226, 234, 233, 326, 324/327; 340/551
See application file for complete search history.

(56) References Cited

U.S. PATENT DOCUMENTS

| | | | | |
|---|---|---|---|---|
| 3,823,365 A | * | 7/1974 | Anderson | 324/328 |
| 4,563,645 A | * | 1/1986 | Kerr | 324/233 |
| 5,304,927 A | * | 4/1994 | Thomas et al. | 324/233 |
| 5,432,444 A | * | 7/1995 | Yasohama et al. | 324/240 |
| 5,519,317 A | | 5/1996 | Guichard et al. | 324/236 |
| 5,654,638 A | * | 8/1997 | Shoemaker | 324/329 |
| 5,691,640 A | | 11/1997 | King | 324/233 |
| 5,729,143 A | | 3/1998 | Tavernetti et al. | 324/329 |
| 5,929,634 A | | 7/1999 | Artinger | 324/233 |

FOREIGN PATENT DOCUMENTS

| | | |
|---|---|---|
| DE | 198 50 749 | 3/2000 |
| EP | 0 780 704 A2 | 6/1997 |
| EP | 0 949 514 A2 | 10/1999 |
| FR | 2 657 696 | 8/1991 |
| GB | 2 230 611 A | 10/1990 |

* cited by examiner

*Primary Examiner*—Bot Ledynh
*Assistant Examiner*—Kenneth J. Whittington
(74) *Attorney, Agent, or Firm*—Needle & Rosenberg, P.C.

(57) ABSTRACT

A metal detector has a circular excitation coil (10) through which foodstuffs to be tested (65) pass, on a conveyor belt (40). The excitation coil (10) is excited by a stable oscillator (50) and the lines of flux generated by the excitation coil (10) link two receiver coils (20, 30) equidistantly spaced either side of the excitation coil (10). As a foodstuff (65) having a foreign ferromagnetic or electrically conductive object therein passes through the receiver coils (20, 30), a voltage is induced in them. This induced voltage is phase compensated. The change in amplitude or frequency of the oscillator (50) as the foodstuff (65) moves through the excitation coil (10) is also passed to the processor (70) which removes the artifacts from the detector signal caused by the volume of the foodstuff (65) itself. The resultant signal, which was previously swamped by the effect of the volume of the foodstuff itself, can then be detected and the foodstuff can be removed from the conveyor (40).

14 Claims, 3 Drawing Sheets

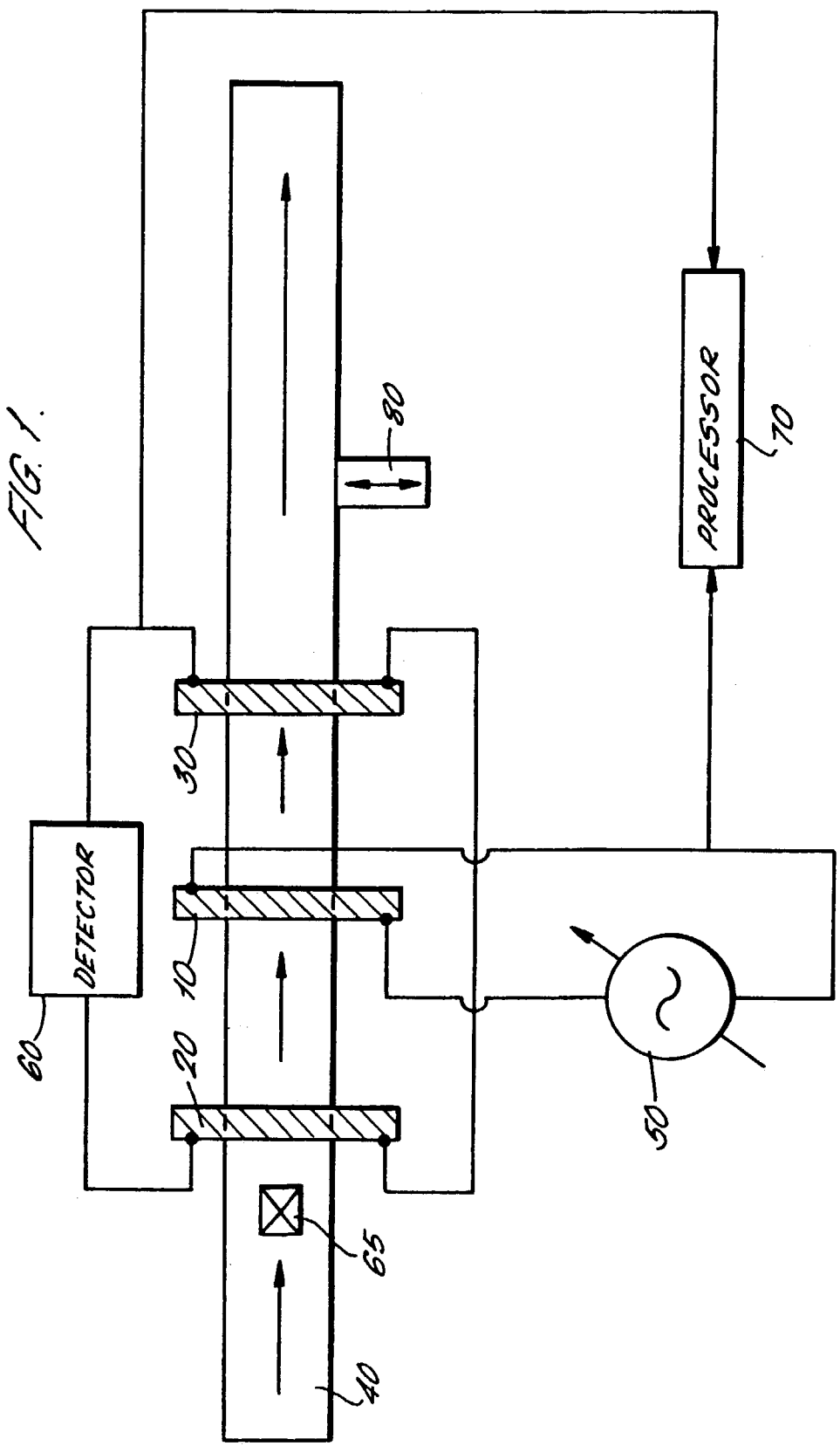

METAL DETECTOR

CROSS REFERENCE TO RELATED APPLICATIONS

The present application claims priority to Great Britain patent application Serial No. 0009936.6, filed Apr. 20, 2000, which applications is incorporated herein in its entirety by this reference.

BACKGROUND OF THE INVENTION

This invention relates to a metal detector in particular for the detection of ferromagnetic or electrically conductive foreign matter in foodstuffs and the like.

Metal detectors have been used for many years to screen foodstuffs for the presence of foreign ferromagnetic or electrically conductive objects (usually metallic) which have been introduced during processing or packaging of the food.

One such arrangement is known as an inductive balance metal detector. Here, a central excitation coil is arranged coaxially with a pair of receiver coils. The three coils are typically coaxial and of similar diameter. The receiver coils are spaced equidistantly on either side of the excitation coil, typically with a spacing of 30–40 mm between the excitation coil and each receiver coil. A highly stable, pure sinewave having a typical frequency between 30 kHz and 1 MHz is applied to the excitation coil and the magnetic field thus generated results in a flux which links each receiver coil equally. The two receiver coils are connected to one another in series opposition so that the induced voltages (strictly, the induced e.m.f.'s) in each cancel out and a net zero output signal is in principle obtained.

Any ferromagnetic or electrically conductive material adjacent to this arrangement causes an imbalance in the flux linking one or other of the receiver coils, so that a voltage of non-zero amplitude is generated in them. This principle is used to allow detection of foreign objects in foodstuffs and the like, by moving the foodstuffs through the coils on a conveyor for example, and looking for a net voltage induced in the receiver coils.

One problem with this arrangement, however, is that both electrically conductive and ferromagnetic objects affect the flux linking the receiver coils. Unfortunately, many foodstuffs to be monitored are electrically conductive. For example, chicken breasts contain a significant quantity of salt water which conducts electricity and thus the voltage measured by the receiver coils as the chicken breast moves through them will change even if there is no contaminant present. This in turn means that if, in fact, there is a contaminant present, its presence is usually masked by the "product signal". The peak amplitude of a 1 mm diameter iron filing can be of the order of only 50 nV. It is therefore highly desirable that the voltages induced from sources other than the contaminant are reduced as nearly as possible to zero.

One technique that has been employed to address this makes use of the different phase angles produced by different materials. The phase angle is the angle between the phase of the sinewave generator or oscillator (taken as 0° for simplicity) and the phase of the voltage induced in the receiver coils. Such a phase angle is not a simple function of the material passing through the detector, but instead depends on several factors such as the size of the material, the frequency of the oscillator, and the type of material.

Nonetheless, the phase angle of a "wet" product such as a chicken breast is sufficiently different to that of a piece of iron or brass, say, that the phase angle can be used to phase compensate for (i.e. filter out) the product itself. Wet products typically have a phase angle between −20° and +20° whereas iron has a phase angle around 100° and brass has a phase angle of around 70°. Thus by filtering the voltage measured at the receiver coils over −20° to +20°, the amplitude of the voltage output of the detector should remain around zero unless a contaminant is present. Having a different phase angle, the contaminant will cause an output voltage at the receiver coils which will not be filtered. This non-zero voltage can be used to trigger a rejection of the contaminated product from the conveyor carrying that product through the detector.

Even with this procedure, however, a residual voltage amplitude arises as a product passes through the detector whether or not it contains contaminants. This amplitude is broadly symmetrical and reaches a maximum as the product passes through the central excitation coil. This residual signal is often referred to as the bulk effect signal, as its magnitude is dependent upon the size or volume of the product itself.

Various attempts to remove the bulk effect signal and allow better sensitivity to small contaminants have been proposed. In one solution, a product passing a sensor on the conveyor triggers a counterbalancing signal of equal and opposite polarity to the bulk effect signal. This counterbalancing signal is electronically subtracted from the residual voltage measured after the product signal has been phased out.

Such a solution is only partly effective, however, as the bulk effect signal is dependent to a significant degree on the size and shape of the product itself: broadly speaking, larger products generate a bigger bulk effect signal. Thus, on a typical production line, with products whose size, shape and orientation to the detector are all different, a residual voltage often remains even with compensation. This can still be sufficient to mask any contaminant signal which, as explained, is typically extremely small.

BRIEF SUMMARY OF THE INVENTION

It is therefore an object of the present invention to address these problems with the prior art and in particular to provide an improved technique for reducing the contaminant detection problems arising from the bulk effect signal.

According to the present invention, there is provided a metal detector for detecting the presence of foreign ferromagnetic or electrically conductive articles in an object to be investigated, comprising: an electromagnetic radiator formed as a loop antenna; an oscillator circuit having an output frequency which is dependent upon the inductive load presented by the electromagnetic radiator, the oscillator circuit being arranged to supply a first, Ac electrical signal to the said electromagnetic radiator such that the electromagnetic radiator generates an alternating magnetic field; first and second electromagnetic receiving antennae electrically connected to one another and each being arranged in proximity to the said electromagnetic radiator such that lines of flux of the alternating magnetic field link the said first and second receiving antennae; a receiving antenna signal detector electrically connected with the said first and second electromagnetic receiving antennae and arranged to provide an output indicative of the amplitude of a second electrical signal induced in the said first and second antennae; an oscillator circuit signal detector electrically connected with the said oscillator circuit and arranged to provide an output representative of a parameter of the said first ac electrical signal supplied thereby; and processor means in communication with the receiving antenna signal detector and the oscillator circuit signal detector, the processor means being arranged to monitor the output of the oscillator circuit signal detector and to adjust the output of the receiving antenna signal detector in dependence upon the output of the oscillator circuit signal detector, in order to compensate for changes in the parameter of the said first ac electrical signal caused by the presence in the proximity of the said electromagnetic radiator of the said object to be investigated.

It has been discovered that the volume of the object to be investigated affects various parameters of the first ac electrical signal supplied to the electromagnetic radiator as the object passes through the metal detector. It is these changes in the first ac signal which appear to cause the bulk effect signal described previously and seen as a non-zero amplitude in the output of the receiving antenna signal detector (even after phase compensation). It is possible to calculate a value to be subtracted from the output of the receiving antenna signal detector on the basis of the monitored changes in the first ac electrical signal such that the effects of the volume of the object to be investigated are cancelled out. This in turn allows a much higher sensitivity to foreign objects (which of course typically have a different phase angle to the object itself).

In a preferred embodiment, the oscillator circuit is arranged to provide an output representative of the amplitude of the first ac electrical signal supplied by the said oscillator circuit, the processor means monitoring changes in the amplitude of the first ac electrical signal caused by the presence of an object in the proximity of the electromagnetic radiator.

Alternatively, the oscillator circuit may be arranged to provide an output representative of the frequency of the first ac electrical signal supplied by the said oscillator circuit, the processor means monitoring changes in the frequency of the first ac electrical signal caused by the presence of an object in the proximity of the electromagnetic radiator.

It is believed that the volume of the product as it passes through the metal detector causes a reduction in the magnetic flux particularly in the aperture enclosed by the loop antenna. This is equivalent to reducing the inductance of the loop antenna. The net effect is to cause the oscillator circuit to output a first ac signal at a higher frequency than it would do in the absence of an object to be investigated. The change in frequency has a consequent effect on the amplitude of that first ac signal as well. Furthermore, certain products containing iron deoxidisers (for example to prolong the lifetime of meat products) may also cause a reduction in the frequency.

Preferably, the electromagnetic radiator is located approximately equidistantly between the first receiver antenna and the second receiver antenna, such that in the absence of an object to be investigated the flux of the alternating magnetic field which links the first receiver antenna is substantially equal to the flux of the alternating magnetic field which links the second receiver. In that case, the first and second receiver antennae may be connected together in series opposition such that the voltage induced in the first receiver antenna is substantially equal to but of opposite polarity to the voltage induced in the second receiver antenna. Most preferably, the receiving antenna signal detector is arranged to provide an output indicative of the amplitude of the net voltage induced in the first and second receiving antennae, the net output being substantially zero in the absence of ferromagnetic or electrically conductive material in the vicinity of the second metal detector.

This arrangement means that the net voltage induced in the first and second receiver antennae is in principle zero in the absence of any objects to be investigated. In combination with the bulk effect compensation of the invention, this is advantageous as it allows the high sensitivity measurements necessary to detect small foreign objects to be carried out without saturating the high gain, amplifiers typically used.

To further ensure that the quiescent net voltage signal (i.e. the background signal absent in the absence of an object to be investigated) is maintained as close to zero as possible, the metal detector may further comprise balancing means (such as an autobalance for example) arranged to adjust the output of the receiving antenna signal detector to compensate for electronic and mechanical/physical drift in the said metal detector. This may be caused by thermal e.m.f.s arising from temperature changes during oscillator warm up and through mechanical warm up of the detector, and due to slow changes in the surrounding environment.

It is preferable that the processor means is further arranged to filter out those signals induced in the said first and second antennae and having a phase angle with respect to the phase of the said first ac electrical signal which is within a predetermined range of phase angles.

The invention also extends to a method for detecting the presence of foreign ferromagnetic or electrically conductive articles in an object to be investigated, the method comprising the steps of: supplying a first ac electrical signal from an oscillator circuit to an electromagnetic radiator formed as a loop antenna such that an alternating magnetic field is generated thereby, the oscillator circuit having an output frequency which is dependent upon the inductive load presented by the electromagnetic radiator; providing first and second electromagnetic receiving antennae electrically connected to one another and each being arranged in proximity to the said electromagnetic radiator such that lines of flux of the alternating magnetic field link the said first and second receiving antennae; determining the amplitude of a second electrical signal induced in the said first and second receiving antennae; monitoring a parameter of the said first ac electrical signal supplied by the said oscillator circuit; and adjusting the determined amplitude of the second electrical signal in dependence upon the monitored parameter of the said first ac electrical signal in order to compensate for changes in parameter of that first ac electrical signal caused by the presence in the proximity of the said electromagnetic radiator of the said object to be investigated.

Further advantageous features are set out in the dependent claims appended hereto.

The invention may be put into practice in a number of ways, one embodiment of which will now be described by way of example only and with reference to the accompanying drawings in which:

BRIEF DESCRIPTION OF THE SEVERAL VIEWS OF THE DRAWINGS

FIG. 1 shows, highly schematically, a plan view of the physical layout of a metal detector embodying the present invention;

DETAILED DESCRIPTION OF THE INVENTION

Figure 2A:
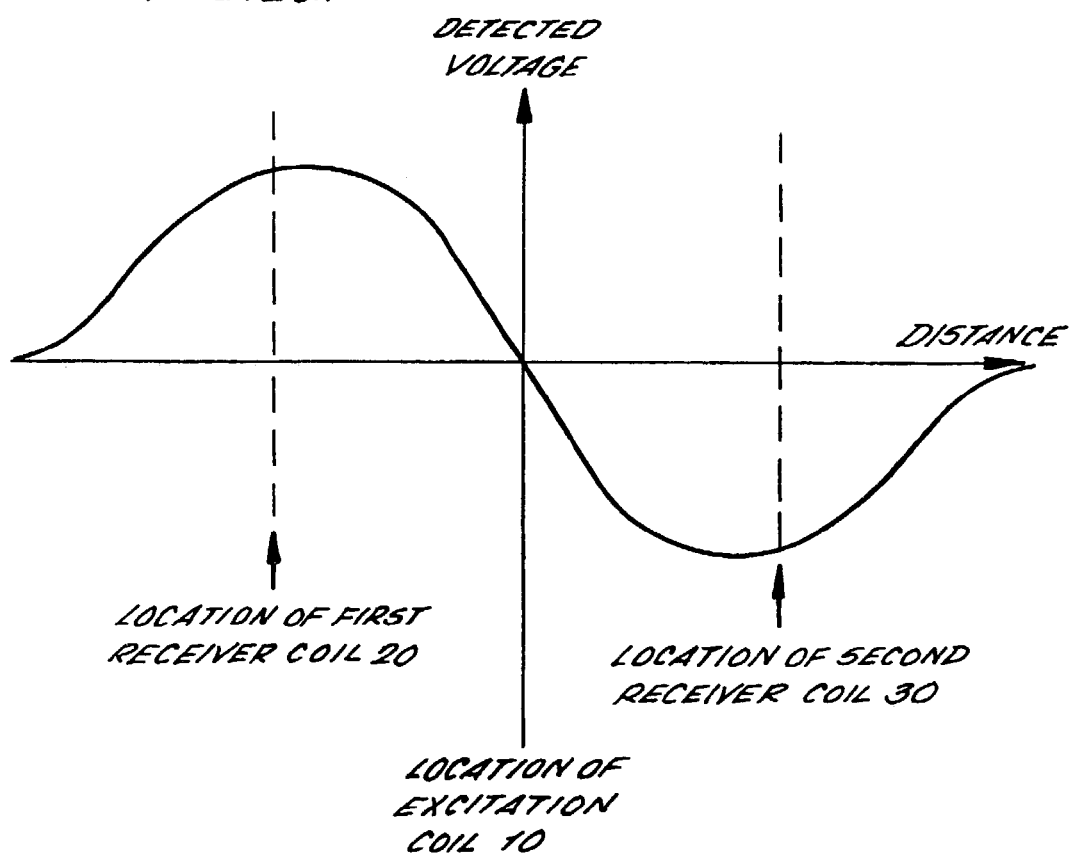
FIG. 2a shows a plot of the amplitude of the signal measured in the receiver coils of the metal detector of FIG. 1, versus position as a ferromagnetic or electrically conductive object passes through the metal detector, without the application of any phase compensation.

FIG. 1 shows a highly schematic plan view of a metal detector embodying the present invention. The metal detector comprises a central excitation coil 10 formed as a loop and arranged between two receiver coils 20, 30. The two receiver coils are also formed as loops. Each of the three coils is typically of similar diameter and the three coils are arranged coaxially with one another. The three coils together will be collectively referred to hereafter as the detector head.

The excitation coil 10 and the two receiver coils 20, 30 of the detector head surround a conveyor 40 which passes generally along an axis perpendicular with the plane of the loops. In FIG. 1, the conveyor is shown moving left to right so that a first receiver coil 20 is upstream of the excitation coil 10, and a second receiver coil 30 is downstream thereof. It will of course be understood that this arrangement is illustrative of the principles only.

A highly stable, pure sinewave oscillator 50 having a typical frequency of between 30 kHz and 1 MHz is employed to drive the excitation coil such that an alternating current magnetic field is generated. The lines of flux of this magnetic field link each of the receiver coils 20, 30 and induce an electromotive force therein. The two receiver coils 20, 30 are connected together in series opposition as shown, so that the voltage across the first receiver coil 20 is of opposite polarity to the voltage across the second receiver coil 30. A detector 60 is connected across the wire linking the two receiver coils 20, 30 so that the net induced voltage in the receiver coils may be detected. This will be described further in connection with FIG. 3 below.

The first and second receiver coils 20, 30 are spaced equidistantly from the excitation coil 10 as shown in FIG. 1. Thus, in the absence of any ferromagnetic or electrically conductive material in the vicinity of the detector head, there is an equal flux linking each of the two receiver coils and at least in principle, the net induced voltage in the receiver coils is zero. In practice, a variety of factors cause drift in the zero point. Thus, the detector includes an autobalancing arrangement to maintain the net voltage as nearly as possible at zero.

A product 65, such as for example a foodstuff, passes along the conveyor 40 and through the detector head where a voltage is induced in the receiver coils 20, 30. The output of the detector 60 and the output of the oscillator 50 are each used as inputs to a processor 70. The processor 70 processes the signal from the detector 60 and the reference signal from the oscillator 50 and determines if a foreign electrically conductive ferromagnetic object is present in the product 65, in a manner to be explained in connection with FIG. 3. A mechanical arm 80 or the like, arranged adjacent to the conveyor 40 and downstream of the excitation coil 10 and the receiver coils 20, 30, is triggered by the processor when a foreign object is detected in the product 65, and the contaminated product 65 is swept off the conveyor 40 and into a collection bin (not shown).

Referring next to FIG. 2a, a plot of the amplitude of the signal measured in the receiver coils of the metal detector of FIG. 1 is shown, as a function of position relative to the detector head as a ferromagnetic or electrically conductive foreign object passes through the detector head. This Figure represents the signal which would be observed absent any phase compensation. It may be seen that the signal rises from zero as the foreign object approaches the first receiver coil 20, reaching a maximum as the object passes through the first receiver coil 20. The induced voltage detected by the detector 60 then falls, reaching zero as the object passes through the excitation coil 10. The amplitude of the induced voltage then begins to rise again, but in an opposite (negative) sense implying a phase reversal. A negative maximum is reached as the object passes through the second receiver coil, after which the induced voltage returns to zero as the object moves away from the detector head. Although not shown in FIG. 2a, the induced voltage signal is in fact slightly skewed about the distance axis, where zero distance is defined to be in the centre of the excitation coil 10. This is due to the bulk effect of the product being inspected.

Figure 2B:
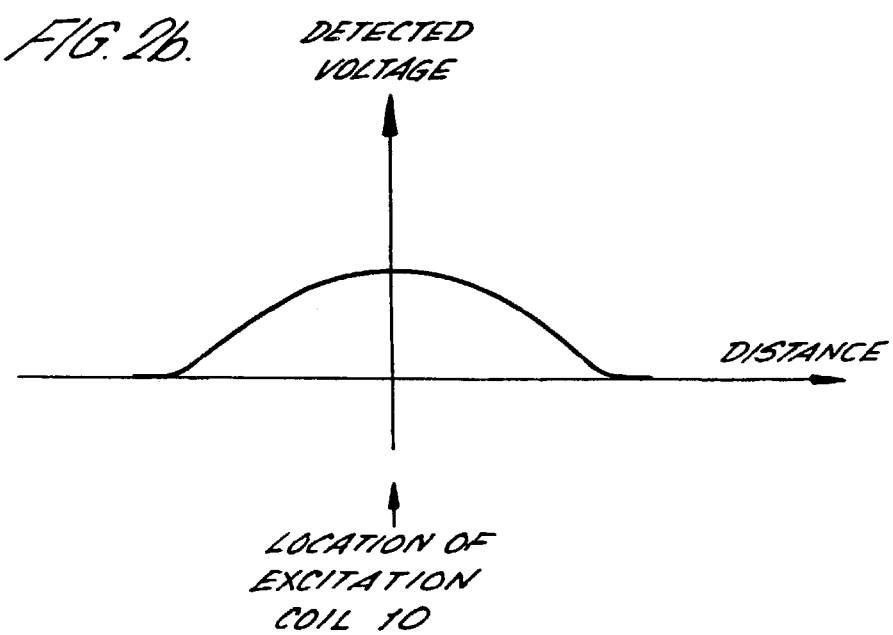
FIG. 2b shows a much magnified plot of the amplitude of the signal measured in the receiver coils of the metal detector of FIG. 1, versus position as a ferromagnetic or electrically conductive object passes through the metal detector, when the object has a significant volume and before compensation for the bulk effect signal.

FIG. 2b shows a plot of the amplitude of the signal measured in the receiver coils 20, 30 of the metal detector of FIG. 1, versus position relative to the detector head as a ferromagnetic or electrically conductive foreign object passes through the detector head. This Figure represents the signal shown in FIG. 2a after phase compensation. Phase compensation is a known technique and is based upon the product to be inspected having a known phase angle or range of phase angles. Signals generated at the product phase angle are, in essence, filtered out so that, in the absence of a foreign ferromagnetic or electrically conductive foreign object, the resultant induced voltage should have zero amplitude. However, as seen in FIG. 2b, there is a small residual signal which is caused by the volume ("bulk") of the product to be inspected. The size of the residual signal is related to the volume of the product. The residual signal can, as previously explained, be sufficiently large that it masks any signal generated by a ferromagnetic or electrically conductive foreign object in the product to be inspected.

Figure 3:
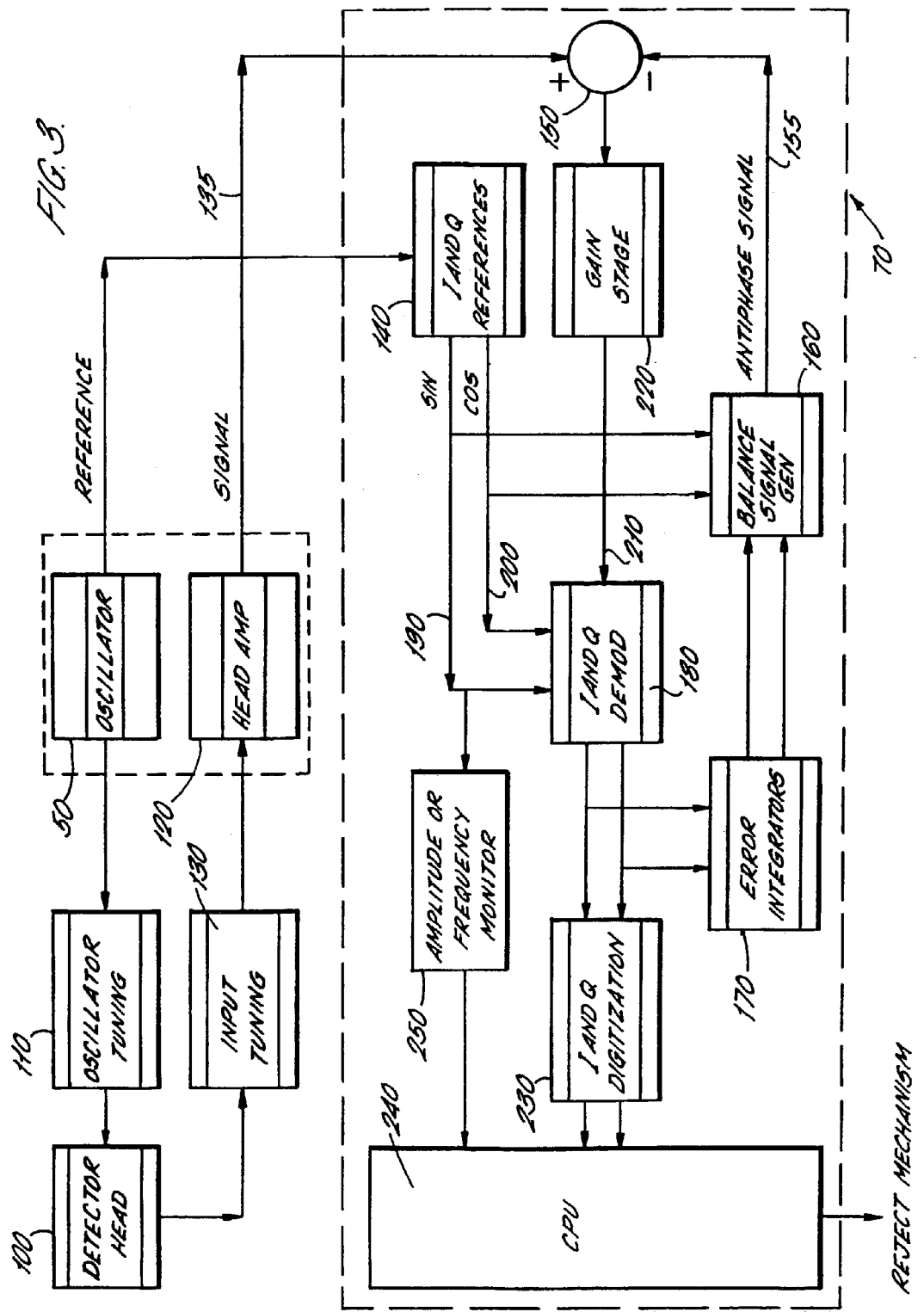
FIG. 3 shows a block diagram of electronic circuitry suitable for controlling the metal detector of FIG. 1.

Turning now to FIG. 3, an arrangement for monitoring the signal induced in the receiver coils 20, 30 of FIG. 1 is shown. As will be explained, the arrangement of FIG. 3 allows not only compensation for the phase angle of the product, but also removes the residual signal caused by the bulk effect.

The detector head, comprising the excitation coil 10 and the two receiver coils 20, 30 of FIG. 1, is shown in FIG. 3 as a schematic block 100. The detector head 100 is supplied with a highly stable, pure sinewave voltage or current by the oscillator 50. This drives the excitation coil of the detector head 100. In order to minimize size, cost and heat dissipation, the circuit of FIG. 3 includes oscillator tuning 110 between the oscillator 50 and the detector head 100. The excitation coil 10 (FIG. 1) may be tuned by, for example, parallel capacitance in order to obtain large circulating currents in the excitation coil itself. Other tuning arrangements, using for example series tuned capacitors, may be employed instead.

The signals picked up by the two receiver coils 20, 30 (FIG. 1) are, as previously mentioned, relatively small and are therefore amplified using a head amplifier 120. An input tuning device 130 may be employed between the two receiver coils of the detector head 100 and the head amplifier 120. The input tuning device 130 improves the signal-to-noise ratio when trying to detect the smallest contaminants in products which themselves have a small volume and do not therefore create a large bulk effect. For products which do have significant volume and therefore create a sizeable bulk effect, the effects of the input tuning device 130 may be heavily damped or entirely removed. Typically, the input tuning device 130 is not simply "on" or "off", but rather has an effect which varies according to the size of the bulk effect.

In addition to supplying the excitation coil in the detector head 100, the oscillator 50 also supplies a highly stable sinewave of known frequency to a reference signal generator 140. The reference signal generator 140 generates a first reference signal (typically referred to as an I reference signal) having a first known phase, amplitude and frequency. The reference signal generator also generates a second reference signal (typically referred to as a Q reference signal which has the same amplitude and frequency as the I reference signal but a phase angle shifted by 90° relative thereto. In other words, if the I reference signal is a sinewave having a given phase, the Q reference signal is a cosinewave having the same phase angle.

The Q reference signal is in preference derived from the I reference signal, for example by using an analog integrator, or a precision phase shifter.

The output of the head amplifier 120, which represents the signal picked up from the receiver coils in the detector head 100, is used as a first input to a summing junction 150. As has previously been explained, temperature effects and the proximity of extraneous large metal objects, for example, cause the nominal zero output of the receiver coils to drift. The summing junction 150 allows slow compensation for these effects, so that a subsequent gain stage 220 is not saturated by unwanted signals. As will be explained below, the summing junction 150 derives an output at least in part from the oscillator 50—this is necessary in preference to using the signal derived from the receiver coils in order to maintain frequency and phase stability.

In addition to the signal on line 135 from the head amplifier 120, the summing junction 150 also receives a signal on a second input line 155 from a balance signal generator 160. The output of the balance signal generator 160 generates a signal which is equal in amplitude to the signal 135 from the head amplifier 120, but is in antiphase thereto. This is carried out by processing the I and Q reference signals to construct a sinewave of appropriate phase and amplitude such that when added to the signal at the summing junction from the head amplifier 120 minimizes the net output of the summing junction 150. Nominally, the output is zero in the absence of a product to be detected.

The balance signal generator 160 constructs the antiphase signal for supplying to the summing junction 150 in dependence not only upon the I and Q reference signals, but also on the basis of error signals provided by error integrators 170. The error integrators monitor the natural, slow-moving imbalances which occur due to temperature variations and the like. As the balance between the receiver coils becomes non-zero for a relatively long period of time, the output of the error integrators 170 will change in order to drive the balance signal generator 160 such that it reconstructs a signal which compensates for the slow-moving changes.

The various feedback loops are closed in FIG. 3 with a demodulator 180 which receives inputs on lines 190 and 200 from the reference signal generator 140, of the I and Q reference signals respectively. The demodulator 180 also receives a third input on line 210 from the summing junction 150, via the gain stage 220. The demodulator 180 generates I and Q information from the output of the gain stage 220. To do this, the I and Q reference signals are used to allow the construction of two dc signals which hold all of the phase and amplitude information contained in the original input signal from the detector head 100. When a signal of known frequency but unknown amplitude is multiplied by a sinewave of the same frequency and phase, the resultant signal is the sum and difference of the frequency. The sum frequency is discarded, and the difference frequency is a dc level whose amplitude represents the amplitude of the unknown amplitude sinewave obtained from the receiver coils of the detector head 100. If the phase angle of the input signal were at 90° to the signal with which it was multiplied, the dc level would be zero. Therefore, by using two reference signals of the same frequency as the unknown input signal, but having reference phases at 90° to each other, the amplitude and phase angle of the input signal may be determined: the amplitude of the input signal is $(A^2+B^2)^{1/2}$, and the phase angle is $\tan^{-1}(A/B)$, where A and B are the amplitudes of the signal representing the product of the I reference signal with the input signal and the product of the Q reference signal with the input signal respectively.

The actual technique used for demodulation does not form part of the present invention. Many techniques have been proposed, for example the use of analogue four quadrant multipliers, synchronous rectification, phase-locked loops, ring modulation and diode detection.

The signals generated by the demodulator 180 representing the amplitude and phase angle of the input signal are used as inputs to the error integrators 170 to generate the error signals described above. The signals from the demodulator 180 are also used as inputs to an analogue-to-digital converter 230 which provide a digital output of I and Q (or A and B). These are received by a central processing unit (CPU) 240. The CPU converts the rectangular coordinates to polar coordinates. It will be understood that, instead, a direct polar coordinate converter could be employed in the arrangement of FIG. 3 instead.

Typically, the detector head 100 includes a manual balancing device, such as, for example, ferrite and other metal slugs which can be applied to the detector head itself. These allow optimal initial balance to be obtained, and electronic autobalance circuits such as are shown in FIG. 3 do not have to counterbalance large offsets. Most modern metal detectors operate at a variety of frequencies, however, and manual balancing techniques are usually unsuitable for fine balancing. Therefore, it is preferably that a combination of electronic and manual balancing is employed.

In order to compensate for the bulk effect, the I and/or Q reference signals are monitored by an amplitude or frequency monitor 250. In FIG. 3, the I reference signal is employed, although the Q reference signal could equally well be employed. The amplitude or frequency monitor 250 detects the amplitude or frequency shift of the oscillator signal due to the bulk effect as a product to be detected passes through the detector head 100. The amplitude or frequency monitor 250 typically includes an analogue-to-digital converter so that the output thereof is a digital signal which can be used as a further input to the CPU 240.

The CPU 240 monitors the I and Q information of the amplified signal in the detector head via analogue to digital conversion. The amplitude and phase information contained in the I and Q signals (using rectangular coordinates) are derived, as previously described, in the CPU 240 which carries out conversion from rectangular to polar coordinates. The phase is compared against a reference phase (usually derived from a product known to be uncontaminated), and if similar, in value, the amplitude information is reduced accordingly. The amplitude information remaining is the bulk effect previously described. At least in theory, therefore, the combination of autobalancing, phase filtering and bulk effect compensation should allow the CPU to detect unwanted foreign objects in products to be monitored without unwanted signals masking the signature from the foreign object.

Although one specific embodiment of the invention has been described, it will be understood by those skilled in the art that various modifications can be made. For example, although the 'autobalance' signal 155 of FIG. 3 is used as one input to the summing junction 150, in fact the autobalance signal 155 may instead be fed directly into the input tuning 130. This latter arrangement prevents saturation of the head amplifier 120. Moreover, it is to be appreciated that compensation for the bulk effect may be carried out either before or after phase compensation. Other forms of phase compensation to those described herein may be used.

In addition, although the described embodiment allows detection of ferromagnetic or electrically conductive foreign objects in domestic foodstuffs, the principles described may be applied to allow monitoring/detection of such foreign objects in other situations. For example, the metal detector of the invention may be placed in proximity to a pipeline to permit bulk flow monitoring, in proximity to a gravity feed to monitor raw materials such as grain, and in proximity to a free flow chute for monitoring pills in the pharmaceutical industry.

The invention claimed is:

1. A metal detector for detecting the presence of foreign ferromagnetic or electrically conductive articles in an object to be investigated, which compensates for the bulk effect which results from the size or shape of the object, comprising:
    an electromagnetic radiator formed as a loop antenna;
    an oscillator circuit having an output frequency which is dependent upon the inductive load presented by the electromagnetic radiator, the oscillator circuit being arranged to supply a first, ac electrical signal to the electromagnetic radiator such that the electromagnetic radiator generates an alternating magnetic field;
    first and second electromagnetic receiving antennae electrically connected to one another and each being arranged in proximity to the electromagnetic radiator such that lines of flux of the alternating magnetic field link the first and second receiving antennae;
    a receiving antenna signal detector electrically connected with the first and second electromagnetic receiving antennae and arranged to provide an output indicative of the amplitude of a second electrical signal induced in the first and second antennae;
    an oscillator circuit signal detector electrically connected with the oscillator circuit and arranged to provide an output representative of a parameter of the first ac electrical signal supplied thereby, wherein said parameter varies with the proximity of said object and said electromagnetic radiator; and
    processor means in communication with the receiving antenna signal detector and the oscillator circuit signal detector, the processor means being arranged to monitor the output of the oscillator circuit signal detector and to adjust the output of the receiving antenna signal detector in dependence upon the output of the oscillator circuit signal detector, in order to compensate for changes in the parameter of the first ac electrical signal caused by the presence in the proximity of the electromagnetic radiator of the object to be investigated.

2. The metal detector of claim 1, in which the oscillator circuit signal detector is arranged to provide an output representative of the amplitude of the first ac electrical signal supplied by the oscillator circuit, the processor means monitoring changes in the amplitude of the first ac electrical signal caused by the presence of an object in the proximity of the electromagnetic radiator.

3. The metal detector of claim 1, in which the oscillator circuit signal detector is arranged to provide an output representative of the frequency of the first ac electrical signal supplied by the oscillator circuit, the processor means monitoring changes in the frequency of the first ac electrical signal caused by the presence of an object in the proximity of the electromagnetic radiator.

4. The metal detector of claim 1, in which the electromagnetic radiator is located approximately equidistantly between the first receiver antenna and the second receiver antenna, such that in the absence of an object to be investigated the flux of the alternating magnetic field which links the first receiver antenna is substantially equal to the flux of the alternating magnetic field which links the second receiver.

5. The metal detector of claim 4, in which the first and second receiver antennae are connected together in series opposition such that the voltage induced in the first receiver antenna is substantially equal to but of opposite polarity to the voltage induced in the second receiver antenna.

6. The metal detector of claim 5, in which the receiving antenna signal detector is arranged to provide an output indicative of the amplitude of the net voltage induced in the first and second receiving antennae, the net output being substantially zero in the absence of ferromagnetic or electrically conductive material in the vicinity of the second metal detector.

7. The metal detector of claim 5, further comprising balancing means arranged to adjust the output of the receiving antenna signal detector to compensate for electronic or mechanical drift in the metal detector.

8. The metal detector of claim 1, in which the processor means is further arranged to filter out those signals induced in the first and second antennae and having a phase angle with respect to the phase of the first ac electrical signal which is within a predetermined range of phase angles.

9. A method for detecting the presence of foreign ferromagnetic or electrically conductive articles in an object to be investigated, and compensating for the bulk effect which results from the size or shape of the object, the method comprising the steps of:
    supplying a first ac electrical signal from an oscillator circuit to an electromagnetic radiator formed as a loop antenna such that an alternating magnetic field is generated thereby, the oscillator circuit having an output frequency which is dependent upon the inductive load presented by the electromagnetic radiator;
    providing first and second electromagnetic receiving antennae electrically connected to one another and each being arranged in proximity to the electromagnetic radiator such that lines of flux of the alternating magnetic field link the first and second receiving antennae;
    determining the amplitude of a second electrical signal induced in the first and second receiving antennae;
    monitoring a parameter of the first ac electrical signal supplied by the oscillator circuit, wherein said parameter varies with the proximity of said object and said electromagnetic radiator; and
    adjusting the determined amplitude of the second electrical signal in dependence upon the monitored parameter of the first ac electrical signal in order to compensate for changes in parameter of that first ac electrical signal caused by the presence in the proximity of the electromagnetic radiator of the object to be investigated.

10. The method of claim 9, in which the step of monitoring the parameter of the first ac electrical signal includes monitoring the amplitude of the first ac electrical signal.

11. The method of claim 9, in which the step of monitoring the parameter of the first ac electrical signal includes monitoring the frequency of the first ac electrical signal.

12. The method of claim 9, further comprising filtering out those signals induced in the first and second antennae which have a phase angle with respect to the phase of the first ac electrical signal which is within a predetermined range of phase angles.

13. The metal detector of claim 1, wherein the parameter is selected from the group of frequency, current and voltage.

14. The method of claim 9, wherein the parameter is selected from the group of frequency, current and voltage.

* * * * *